G. W. & G. L. HOWELL.
Harrow Attachment for Corn-Plows.

No. 222,275. Patented Dec. 2, 1879.

Witnesses
Fred G. Dietrich
Joseph T. Power

Inventor:
George W Howell
Gilbert L Howell
by Louis Bagger & Co.
Attorneys

UNITED STATES PATENT OFFICE.

GEORGE W. HOWELL AND GILBERT L. HOWELL, OF FLETCHER, OHIO.

IMPROVEMENT IN HARROW ATTACHMENTS FOR CORN-PLOWS.

Specification forming part of Letters Patent No. 222,275, dated December 2, 1879; application filed September 3, 1879.

*To all whom it may concern:*

Be it known that we, GEORGE W. HOWELL and GILBERT L. HOWELL, both of Fletcher, in the county of Miami and State of Ohio, have invented certain new and useful Improvements in Harrow Attachments for Corn-Plows; and we do hereby declare that the following is a full, clear, and exact description of the invention, which will enable others skilled in the art to which it appertains to make and use the same, reference being had to the accompanying drawings, which form a part of this specification, and in which—

Figure 1:
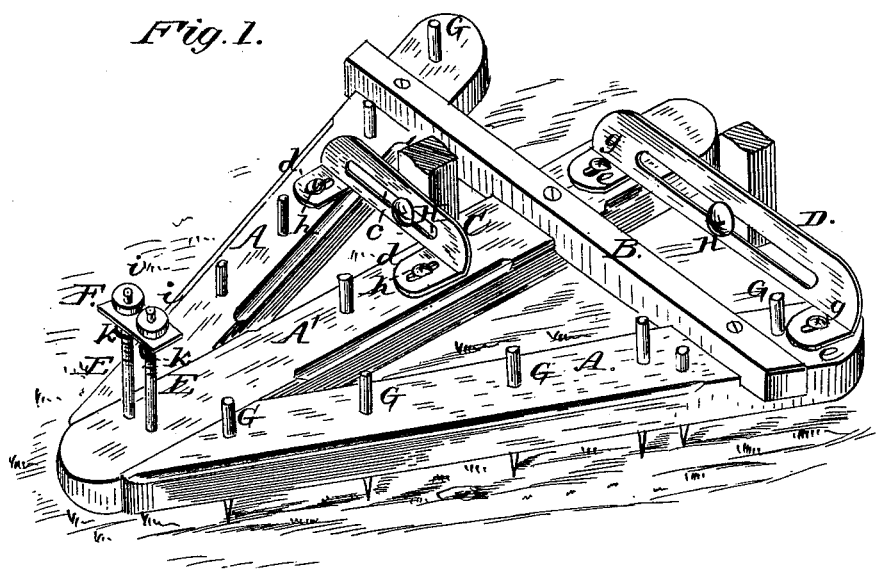
Figure 2:
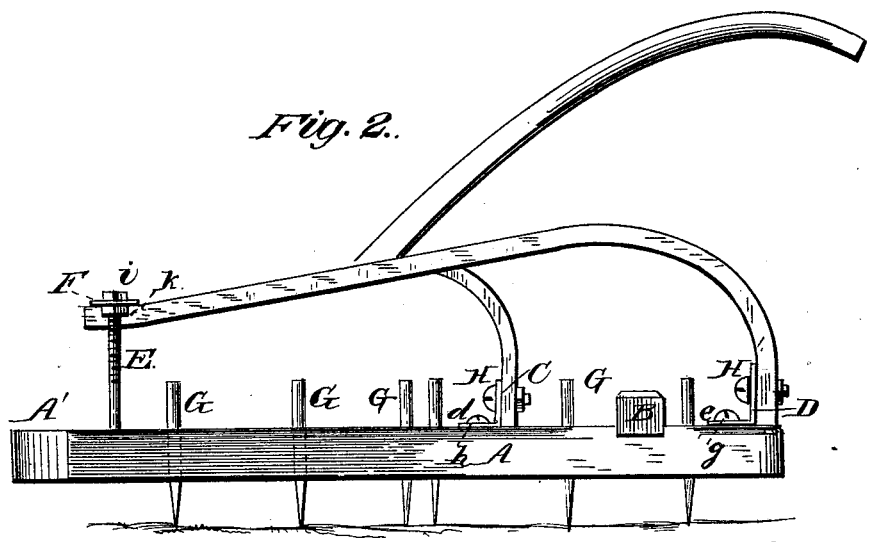

Figure 1 is a top view, in perspective, of our improved harrow attachment; and Fig. 2 is a side elevation, showing the harrow attached to the plow ready for operation.

Similar letters of reference indicate corresponding parts in both the figures.

This invention has relation to that class of harrows or harrow attachments which are used in corn for the purpose of pulverizing the soil without injury to the young plants; and it consists in the construction of a harrow adapted to be attached to and used in combination with a corn-plow or cultivator, substantially as hereinafter more fully set forth.

In the drawings, A A are the two side beams, which, with the central beam, A′, form the triangular frame of the harrow. The diverging rear ends of beams A A′ A are united by a cross-beam, B, in front of which, on one side, is a casting, C, having a longitudinal slot, $c$, and provided with two right-angled arms, $d\ d$, both of which are slotted longitudinally, and form means of attachment for the casting C upon the center beam, A′, and one of the side beams, A, parallel to the cross-beam B, as shown in the drawings.

On the other side of the harrow, back of the cross-beam B, is a similar, but longer, slotted casting, D, the feet $e\ e$ of which are secured adjustably upon the center beam, A′, and side beam, A.

By means of nutted bolts or set-screws $g\ g$ $h\ h$ the slotted braces or castings D C may be adjusted upon the harrow longitudinally.

Upon the front end of the triangular frame are secured two parallel vertical rods, E E, united at top by a cross-piece, F, which may be adjusted by nuts or burrs $i\ i\ k\ k$.

G are the teeth, of which there is one upon the center beam, and a row of five or more upon each of the side beams.

If desired, small shovels may be substituted for the teeth.

The attachment is secured upon the plow by inserting the beam between the two uprights E E and adjusting the clamp or cross-piece F, so that the beam will be held firmly between said uprights.

The back part of the harrow is fastened to the sheath of the plow by headed bolts H H, Fig. 2, which pass through the slotted braces C D, and may be tightened down, so as to adjust that portion of the harrow properly upon the sheath.

Thus it will be seen that the harrow may be adjusted laterally as well as longitudinally upon the plow by means of the slotted braces C D and their slotted feet $d\ d\ e\ e$, which adapts the same attachment for use upon plows of different length and width.

By this attachment, which is inexpensive and exceedingly simple and durable in its construction, the soil will be thoroughly pulverized without danger of covering the young corn, inasmuch as the harrow, attached to the plow in the manner shown and described, is under the absolute control of the operator.

The harrow may be adjusted to be used with either a single or a double plow, and can be attached and again detached in a few moments.

Having thus described our invention, we claim and desire to secure by Letters Patent of the United States—

A harrow attachment for plows, consisting of the triangular frame A A′ A B, having teeth or shovels G, and provided on opposite sides of the cross-piece B with slotted adjustable braces C D, parallel to said cross-piece and to each other, and having slotted feet $d\ d$ $e\ e$ and set-screws $h\ h\ g\ g$, and having at its front end the standards E E, cross-piece F, and adjusting-nuts $i\ i\ k\ k$, all constructed and combined to operate substantially as and for the purpose set forth.

In testimony that we claim the foregoing as our own we have hereunto affixed our signatures in presence of two witnesses.

GEORGE W. HOWELL.
GILBERT L. HOWELL.

Witnesses:
I. S. KISER,
W. A. LEWIS.